United States Patent
Yano et al.

(10) Patent No.: US 6,618,227 B2
(45) Date of Patent: Sep. 9, 2003

(54) COMBINATION PERPENDICULAR RECORD AND REPRODUCE HEAD HAVING AN AUXILIARY POLE RECESSED FROM AN AIR BEARING SURFACE AND SPACED FROM ONE OF A PAIR OF REPRODUCING ELEMENT SHEILDS

(75) Inventors: Koji Yano, Ome (JP); Akihiko Takeo, Kunitachi (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/797,677

(22) Filed: Mar. 5, 2001

(65) Prior Publication Data

US 2002/0036871 A1 Mar. 28, 2002

(30) Foreign Application Priority Data

Sep. 22, 2000 (JP) ........................................ 2000-289312

(51) Int. Cl.⁷ ................................................ G11B 5/39
(52) U.S. Cl. ...................................... 360/317; 360/319
(58) Field of Search ................................ 360/317, 126, 360/319

(56) References Cited

U.S. PATENT DOCUMENTS

| | | | |
|---|---|---|---|
| 4,251,842 A | 2/1981 | Iwasaki et al. | 360/134 |
| 4,725,909 A | 2/1988 | Kawai | 360/126 |
| 4,771,350 A | 9/1988 | Desserre | 360/123 |
| 4,873,599 A | 10/1989 | Sueoka | 360/126 |
| 5,073,836 A * | 12/1991 | Gill et al. | 360/317 |
| 5,835,316 A * | 11/1998 | Mukaide et al. | 360/126 |
| 5,995,339 A * | 11/1999 | Koshikawa et al. | 360/321 |
| 6,101,067 A * | 8/2000 | Matsuzono et al. | 360/317 |
| 6,128,166 A * | 10/2000 | Tanaka et al. | 360/317 |
| 6,292,329 B1 * | 9/2001 | Sato et al. | 360/126 |

FOREIGN PATENT DOCUMENTS

| | | | |
|---|---|---|---|
| JP | 6-236526 A | * | 8/1994 |
| JP | 7-161019 A | * | 6/1995 |
| JP | 7-201021 | | 8/1995 |
| JP | 7-225912 A | * | 8/1995 |
| JP | 7-235002 A | * | 9/1995 |
| JP | 10-320720 A | * | 12/1998 |
| JP | 2000-48321 A | * | 2/2000 |

* cited by examiner

Primary Examiner—Jefferson Evans
(74) Attorney, Agent, or Firm—Finnegan, Henderson, Farabow, Garrett & Dunner, L.L.P.

(57) ABSTRACT

A magnetic recording apparatus has a two-layered medium of a soft magnetic backing layer and a perpendicular recording layer, and a perpendicular recording head having a recording section including a main magnetic pole, an auxiliary magnetic pole and an exciting coil, and a reproducing section including a reproducing element sandwiched between a pair of reproducing shields, the reproducing section and the recording section being formed separately from each other. The auxiliary magnetic pole is recessed from the air-bearing surface of the main magnetic pole, and the distance between the auxiliary magnetic pole and the reproducing shield positioned adjacent to the auxiliary magnetic pole is set to permit a magnetic field generated under the auxiliary magnetic pole to be larger than a magnetic field under the shield.

9 Claims, 3 Drawing Sheets

COMBINATION PERPENDICULAR RECORD AND REPRODUCE HEAD HAVING AN AUXILIARY POLE RECESSED FROM AN AIR BEARING SURFACE AND SPACED FROM ONE OF A PAIR OF REPRODUCING ELEMENT SHEILDS

CROSS-REFERENCE TO RELATED APPLICATIONS

This application is based upon and claims the benefit of priority from the prior Japanese Patent Application No. 2000-289312, filed Sep. 22, 2000, the entire contents of which are incorporated herein by reference.

BACKGROUND OF THE INVENTION

The present invention relates to a recording head and a magnetic recording apparatus.

In the field of computers, a magnetic disc apparatus is widely used as a large capacity external storage capable of random access. With increase in the use of the magnetic disc apparatus, demands for increases in storage capacity and in recording density of the magnetic disc apparatus are being made higher and higher.

As a method for increasing the recording density of the magnetic disc apparatus, proposed is perpendicular magnetic recording. In the perpendicular magnetic recording, a demagnetizing field in a magnetization transition can be made very low so as to narrow the magnetization transition width, compared with longitudinal magnetic recording. As a result, high-density recording can be achieved in the perpendicular magnetic recording. Also, in order to improve recording and reproducing efficiency in the perpendicular magnetic recording so as to form a sharper magnetization transition, proposed is a magnetic disc of a two-layered perpendicular medium in which a soft magnetic backing layer is formed below a perpendicular magnetic recording layer.

A magnetic head used for a two-layered perpendicular medium is disclosed in, for example, Japanese Patent Application Kokai Publication No. 7-225912. The magnetic head disclosed in this prior art comprises a reproducing section and a recording section formed integral with the reproducing section, the recording section including a main magnetic pole and an auxiliary magnetic pole, which are arranged with a gap, and an exciting coil. The auxiliary magnetic pole is recessed from the air-bearing surface of the main magnetic pole, and a projecting section projecting toward the main magnetic pole is arranged on the surface of the auxiliary magnetic pole that faces the main magnetic pole.

In this magnetic head, a magnetic field is weak below the auxiliary magnetic pole having a large air-bearing area. In addition, it is possible to suppress broadening of the magnetic field by allowing the auxiliary magnetic pole to be recessed from the air-bearing surface of the main magnetic pole. It should also be noted that, since the projecting section projecting toward the main magnetic pole is arranged on the surface of the auxiliary magnetic pole that faces the main magnetic pole, it is possible to permit the magnetic flux from the backing layer to pass sufficiently into the auxiliary magnetic pole so as to improve reproducing characteristics. However, since the improvement of the reproducing characteristics is limited in this magnetic head, it is necessary to use a reproducing element such as a giant magnetoresistive element (GMR element).

As a magnetic head using a GMR element in the reproducing section, known is a merge type structure having a common magnetic pole acting both as one of a pair of shields of the reproducing section sandwiching the GMR element and as an auxiliary electrode of the recording section. In this structure, reproducing sensitivity is lowered if the common magnetic pole acting both as a shield and as an auxiliary electrode is recessed from the air-bearing surface of the main magnetic pole. Therefore, it is insignificant to permit the common magnetic pole to be recessed from the air-bearing surface of the main magnetic pole. In order to weaken magnetic field intensity below the common magnetic pole in this structure, it is necessary to increase considerably the air-bearing area of the common magnetic pole. However, it has been clarified that, if a track pitch is narrowed with improvement in recording density, the magnetic field generated under the common magnetic pole extends to reach adjacent tracks. It follows that, when recording is repeatedly performed in a certain track, information recorded in the adjacent tracks may be erased.

On the other hand, in a magnetic head in which the reproducing section and the recording section are separated from each other, it is possible to permit only the auxiliary magnetic pole of the recording section to be recessed from the air-bearing surface of the main magnetic pole. As a result, it is possible to suppress broadening of the magnetic field under the auxiliary magnetic pole so as to avoid the adverse effect given to the adjacent tracks. It has been found, however, that, in this structure, the magnetic flux passing through the shields of the reproducing section is increased and, thus, information in the adjacent tracks may be erased by the magnetic field under the shields.

BRIEF SUMMARY OF THE INVENTION

An object of the present invention is to decrease, in a recording head of a separated type, a magnetic flux passing through shields of a reproducing section even if an auxiliary magnetic pole is recessed from the air-bearing surface of a main magnetic pole so as to prevent the magnetic fields under the auxiliary magnetic pole and under the shields of the reproducing section from adversely affecting adjacent tracks, thereby providing a recording head and a perpendicular magnetic recording apparatus having improved reliability even in high-density recording.

According to an aspect of the present invention, there is provided a recording head, comprising a main magnetic pole, an auxiliary magnetic pole provided to face the main magnetic pole with a gap and recessed from an air-bearing surface of the main magnetic pole, an exciting coil, a reproducing element, a pair of reproducing shields sandwiching the reproducing element, one of the reproducing shields adjacent to the auxiliary magnetic pole being positioned apart from the auxiliary magnetic pole by such a distance that a magnetic field generated in recording under the auxiliary magnetic pole becomes larger than a magnetic field under the reproducing shield.

According to another aspect of the present invention, there is provided a magnetic recording apparatus, comprising a two-layered medium comprising a soft magnetic backing layer and a perpendicular recording layer, and a recording head comprising a main magnetic pole, an auxiliary magnetic pole provided to face the main magnetic pole with a gap and recessed from an air-bearing surface against the medium of the main magnetic pole, an exciting coil, a reproducing element, a pair of reproducing shields sandwiching the reproducing element, one of the reproducing shields adjacent to the auxiliary magnetic pole being positioned apart from the auxiliary magnetic pole by such a distance that a magnetic field generated in recording under the auxiliary magnetic pole becomes larger than a magnetic field under the reproducing shield.

In the recording head and the magnetic recording apparatus of the present invention, it is desirable for the distance L between the auxiliary magnetic pole and the reproducing shield positioned adjacent to the auxiliary magnetic pole to meet the relationship in the following formula:

$$L > D \cdot S1/S3$$

where D represents a recessed distance of the auxiliary magnetic pole from the main magnetic pole, S1 represents an overlapping area between the auxiliary magnetic pole and the reproducing shield, and S3 represents an air-bearing area of the reproducing shield.

Further, in the magnetic recording apparatus of the present invention, it is desirable for the perpendicular recording layer to show a magnetization curve in which a point at which irreversible magnetic reversal begins to take place resides in the second quadrant, and an absolute value of a magnetic field corresponding to an intersection between a tangential line of the magnetization curve drawn from a point of coercive force in a region where an applied magnetic field is negative and a straight line drawn in a horizontal direction from a point of residual magnetization is greater than a magnetic field generated under the auxiliary magnetic pole in recording.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will now be described in detail with reference to the accompanying drawings.

Figure 1:
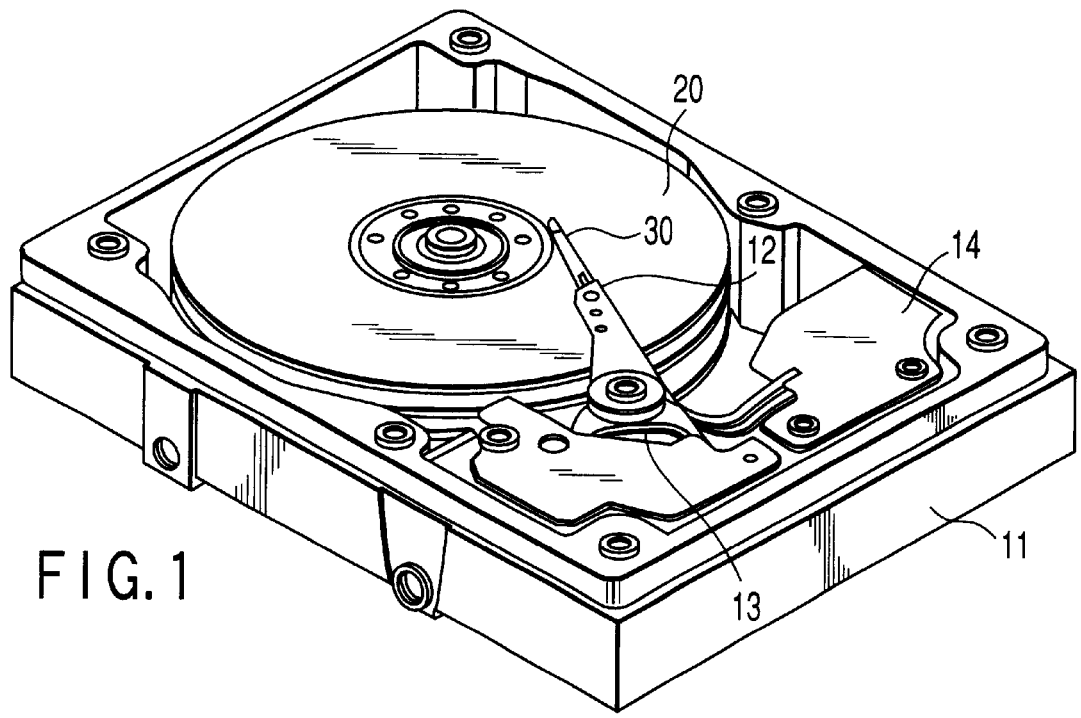
FIG. 1 is a perspective view showing a magnetic recording apparatus according to an embodiment of the present invention.

FIG. 1 is a perspective view showing a magnetic recording apparatus according to an embodiment of the present invention. As shown in the drawing, the magnetic recording medium 20 rotatably mounted to a spindle motor is housed in the casing 11. Also, the suspension 12 is mounted to the voice coil motor 13 so as to be pivotally rotatable along the surface of the magnetic recording medium 20, and the head 30 is mounted to the tip of the suspension 12. The head 30 is connected to the head amplifier circuit 14.

Figure 2:
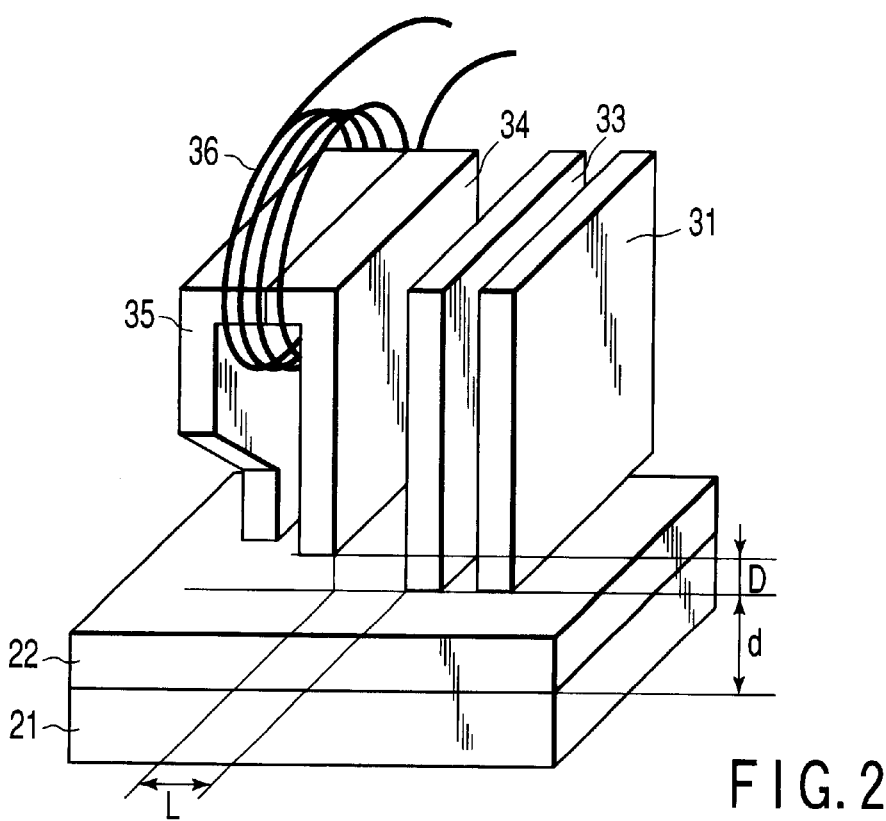
FIG. 2 is a perspective view showing a recording head and a recording medium according to an embodiment of the present invention.
Figure 3:
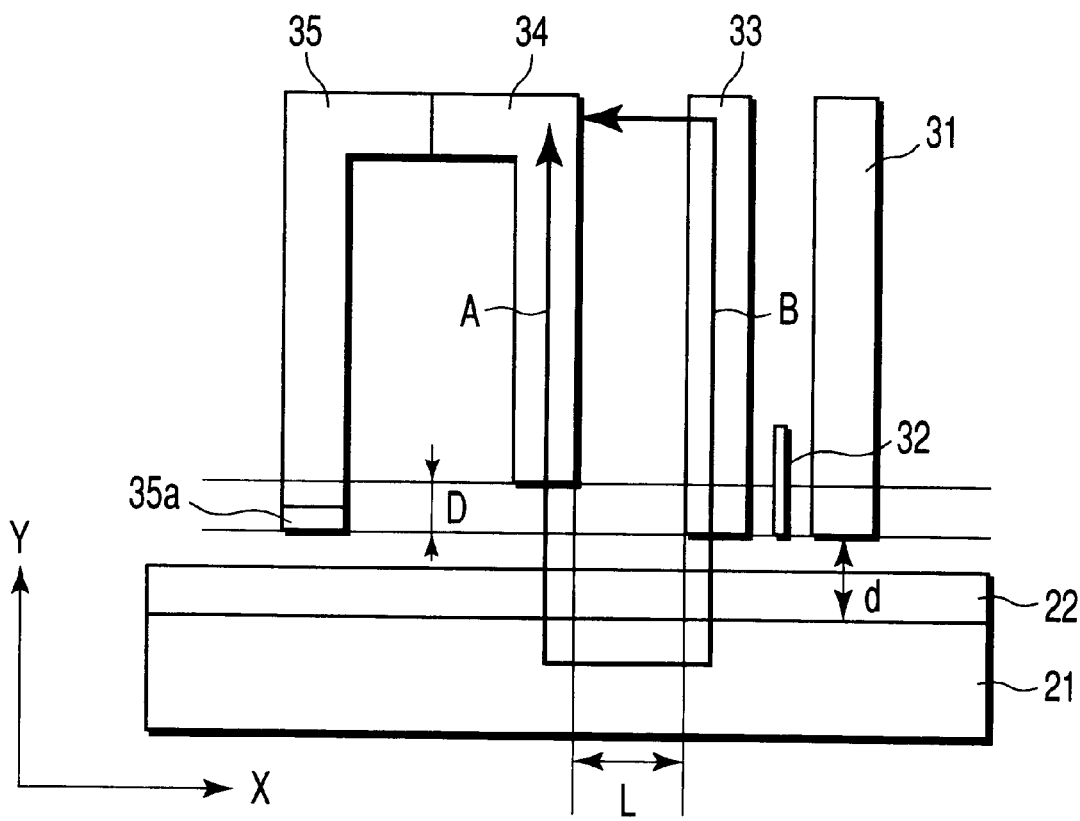
FIG. 3 is a side view showing a magnetic flux passing through a recording head and a recording medium according to an embodiment of the present invention.
Figure 4:
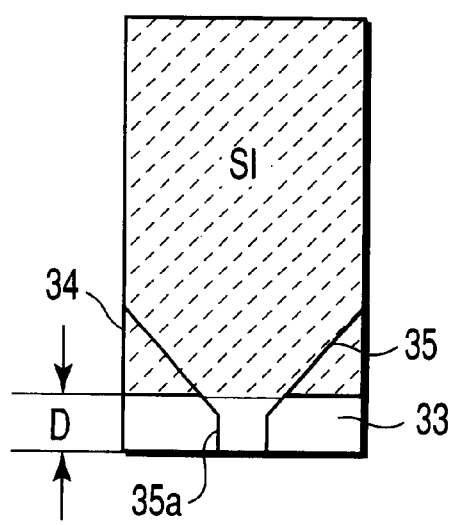
FIG. 4 shows a recording head according to an embodiment of the present invention as viewed from the side of the main magnetic pole.
Figure 5:
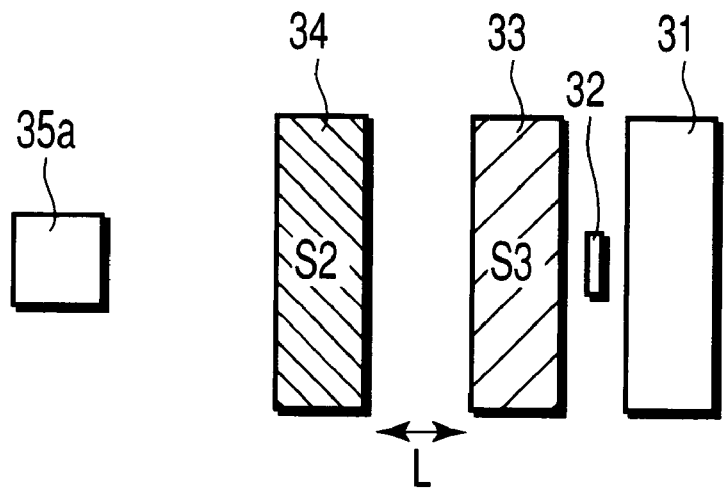
FIG. 5 shows a recording head according to an embodiment of the present invention as viewed from the side of the air-bearing surface.

The constructions of the recording head and the recording medium according to an embodiment of the present invention will now be described in detail with reference to FIGS. 2 to 5. FIG. 2 is a perspective view showing a recording head and a recording medium. FIG. 3 is a side view showing a magnetic flux passing through a recording head and a recording medium. FIG. 4 shows a recording head as viewed from the side of the main magnetic pole. Further, FIG. 5 shows a recording head as viewed from the side of the air-bearing surface.

As shown in FIGS. 2 and 3, the recording medium is a two-layered medium comprising the soft magnetic backing layer 21 and the perpendicular recording layer 22, which are laminated on a substrate (not shown). Incidentally, a protective layer (not shown) and a lubricating layer (not shown) are formed on the perpendicular recording layer 22. It is possible to form an underlayer below the soft magnetic backing layer 21 or the perpendicular magnetic recording layer 22 for the purpose of, for example, controlling crystal orientation.

As shown in FIGS. 2 and 3, the magnetic head according to the present invention is a separated type magnetic head in which the reproducing section and the recording section are separated from each other. To be more specific, the reproducing section comprises the lower shield 31, the reproducing element 32, e.g., a GMR element, embedded in an insulating layer defining the reproducing gap, and the upper shield 33. In addition, the recording section comprises the auxiliary magnetic pole 34 formed on the upper shield 33 with intervening an insulating film, the main magnetic pole 35 forming a gap with the auxiliary magnetic pole 34 on the side of the air-bearing surface and magnetically coupled with the auxiliary magnetic pole 34 at a position apart from the air bearing surface, and an exciting coil 36 acting on both the auxiliary magnetic pole 34 and the main magnetic pole 35. The air-bearing portion 35a of the main magnetic pole 35 is made of a material having a high saturation flux density (Bs). Each of the main magnetic pole 35, the auxiliary magnetic pole 34, and the shields 33 and 31 is formed of a soft magnetic material such as permalloy.

In the magnetic head of the present invention, the air-bearing surface of the auxiliary magnetic pole 34 is recessed by a distance D in the direction (Y-direction) perpendicular to the medium from the air-bearing surface of the main magnetic pole 35. The particular construction makes it possible to suppress broadening of the magnetic field below the auxiliary magnetic pole 34 so as to avoid a detrimental effect given to adjacent tracks.

Also, in the magnetic head of the present invention, the auxiliary magnetic pole 34 and the upper shield 33 in the reproducing section, which is positioned adjacent to the auxiliary magnetic pole 34, are arranged apart from each other by a distance L in the head running direction (X-direction). In the present invention, the distance L noted above is set to permit a magnetic field generated under the auxiliary magnetic pole 34 during the recording process to be larger than a magnetic field generated under the upper shield 33.

The criterion for defining the distance L will now be described in detail. As shown in FIGS. 2 and 3, d represents the distance between the main magnetic pole 35 and the soft magnetic backing layer 21 of the recording medium during the recording operation. As shown in FIG. 4, S1 represents the overlapping area between the auxiliary magnetic pole 34 and the adjacent upper shield 33. Further, as shown in FIG. 5, S2 represents the air-bearing area of the auxiliary magnetic pole 34, and S3 represents the air-bearing area of the upper shield 33. The permeability of each of the soft magnetic backing layer 21, the auxiliary magnetic pole 34 and the upper shield 33 is assumed to be infinity, and the permeability of each of the recording layer 22 and the air is assumed to be unity.

In general, reluctance Rm is represented by the formula given below:

$$Rm = \int (1/\mu S) \partial l$$

where l represents a length passed by a magnetic flux, S represents a cross sectional area passed by a magnetic flux, and $\mu$ represents permeability. As shown in FIG. 3, A represents a magnetic flux passing through the auxiliary magnetic pole 34, and B represents a magnetic flux passing through the upper shield 33.

In this case, the reluctance Rm(A) of the auxiliary magnetic pole 34 and the reluctance Rm(B) of the upper shield 33 are represented as follows:

$$Rm(A) = (d+D)/S2$$

$$Rm(B) = d/S3 + L/S1$$

Also, the magnetic field H(A) below the auxiliary magnetic pole 34 and the magnetic field H(B) below the upper shield 33 are represented as follows:

$$H(A) = F/(Rm(A) \cdot S2)$$

$$H(B) = F/(Rm(B) \cdot S3)$$

where F represents magnetomotive force.

It follows that, in order to make the magnetic field under the auxiliary magnetic pole 34 larger than the magnetic field below the upper shield 33, it is necessary to satisfy the condition of H(A)>H(B). Resolving the formulas given above gives that the distance L between the auxiliary magnetic pole 34 and the upper shield 33 should meet the following relationship:

$$L > D \cdot S1/S3.$$

If the condition given above is satisfied, it is possible to prevent information in the adjacent tracks from being erased by the magnetic fields under the auxiliary magnetic pole 34 and under the upper shield 33 even if recording density is increased so as to provide high reliability.

Figure 6:
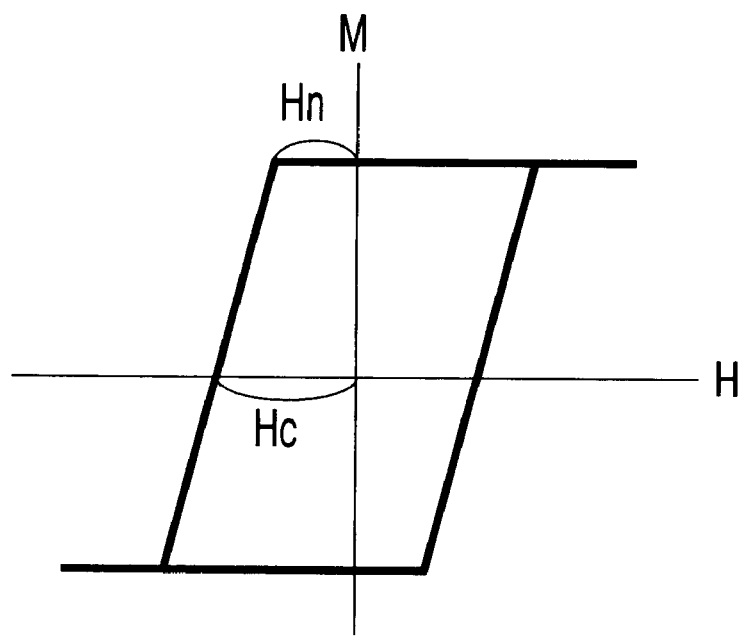
FIG. 6 shows a magnetization curve of a recording medium suitably used in the present invention.

It is desirable for the perpendicular recording layer of the recording medium used in the present invention to show a magnetization curve in which a point at which irreversible magnetic reversal begins to take place resides in the second quadrant, and an absolute value Hn of a magnetic field corresponding to the intersection between a tangential line of the magnetization curve drawn from a point of coercive force in a region where an applied magnetic field is negative and a straight line drawn in a horizontal direction from a point of residual magnetization to be greater than a magnetic field generated under the auxiliary magnetic pole during recording. FIG. 6 shows a magnetization curve of a suitable perpendicular recording layer. As shown in FIG. 6, Hn represents the length of the shoulder portion in the second quadrant of the hysteresis loop of the perpendicular recording layer. In the case of using a perpendicular recording layer showing the particular magnetization curve, it is possible to prevent the problem that, if recording is repeatedly in a certain track, the information in the adjacent tracks is erased by the magnetic field under the auxiliary magnetic pole and under the upper shield.

To be more specific, the condition of $L > 2.0 \, \mu m$ is established in a magnetic recording apparatus in which each of D and d is set at 100 [nm], each of S2 and S3 is set at 1 [$\mu m$] (width)×t [$\mu m$] (thickness), and S1 is set at 20t [$\mu m$] (height)×l [$\mu m$] (width). As a matter of fact, it has been found that a recording apparatus having a magnetic head in which the distance L is set to 3.0 $\mu m$ shows excellent long-term reliability, whereas an apparatus having a magnetic head in which L is set to 1.0 $\mu m$ is poor in long-term reliability, as expected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording/reproducing head comprising:
   a main magnetic pole;
   an auxiliary magnetic pole provided to face the main magnetic pole with a gap therebetween and recessed from an air-bearing surface of the main magnetic pole;
   an exciting coil;
   a reproducing element;
   a pair of reproducing shields sandwiching the reproducing element, one of the reproducing shields adjacent to the auxiliary magnetic pole being positioned apart from the auxiliary magnetic pole by such a distance that a magnetic field generated in recording under the auxiliary magnetic pole becomes larger than a magnetic field under the reproducing shield.

2. The head according to claim 1, wherein the distance L between the auxiliary magnetic pole and the reproducing shield adjacent to the auxiliary magnetic pole is set to meet the relationship in the following formula:

$$L > D \cdot S1/S3$$

where D represents a recessed distance of the auxiliary magnetic pole from the air-bearing surface, S1 represents an overlapping area between the auxiliary magnetic pole and the reproducing shield, and S3 represents an air-bearing area of the reproducing shield.

3. The head according to claim 1, wherein an air-bearing portion of the main magnetic pole is made of a material having a high saturation flux density.

4. The head according to claim 1, wherein the reproducing element is a giant magnetoresistive element.

5. A magnetic recording apparatus, comprising:
   a two-layered medium comprising a soft magnetic backing layer and a perpendicular recording layer; and
   a recording head comprising a main magnetic pole, an auxiliary magnetic pole provided to face the main magnetic pole with a gap therebetween and recessed from an air-bearing surface against said medium of the main magnetic pole, an exciting coil, a reproducing element, a pair of reproducing shields sandwiching the reproducing element, one of the reproducing shields adjacent to the auxiliary magnetic pole being positioned apart from the auxiliary magnetic pole by such a distance that a magnetic field generated in recording under the auxiliary magnetic pole becomes larger than a magnetic field under the reproducing shield.

6. The apparatus according to claim 5, wherein the distance L between the auxiliary magnetic pole and the reproducing shield adjacent to the auxiliary magnetic pole is set to meet the relationship in the following formula:

$$L > D \cdot S1/S3$$

where D represents a recessed distance of the auxiliary magnetic pole from the air-bearing surface, S1 represents an overlapping area between the auxiliary magnetic pole and the reproducing shield, and S3 represents an air-bearing area of the reproducing shield.

7. The apparatus according to claim 5, wherein an air-bearing portion of the main magnetic pole is made of a material having a high saturation flux density.

8. The apparatus according to claim 5, wherein the reproducing element is a giant magnetoresistive element.

9. A magnetic recording apparatus, comprising:

a two-layered medium comprising a soft magnetic backing layer and a perpendicular recording layer, the perpendicular recording layer showing a magnetization curve in which a point at which irreversible magnetic reversal begins to take place resides in the second quadrant and an absolute value of a magnetic field corresponding to an intersection between a tangential line of the magnetization curve drawn from a point of coercive force in a region where an applied magnetic field is negative and a straight line drawn in a horizontal direction from a point of residual magnetization is greater than a magnetic field generated in recording under the auxiliary magnetic pole; and a recording head comprising a main magnetic pole, an auxiliary magnetic pole provided to face the main magnetic pole with a gap therebetween and recessed from an air-bearing surface against said medium of the main magnetic pole, and exciting coil, a reproducing element, a pair of reproducing shields sandwiching the reproducing element, one of the reproducing shields adjacent to the auxiliary magnetic pole being positioned apart from the auxiliary magnetic pole by such a distance that a magnetic field generated in recording under the auxiliary magnetic pole becomes larger than a magnetic field under the reproducing shield.

\* \* \* \* \*

UNITED STATES PATENT AND TRADEMARK OFFICE
CERTIFICATE OF CORRECTION

PATENT NO.     : 6,618,227 B2                                                Page 1 of 1
DATED          : September 9, 2003
INVENTOR(S)    : Koji Yano et al.

It is certified that error appears in the above-identified patent and that said Letters Patent is hereby corrected as shown below:

<u>Title page,</u>
Item [*] Notice, should read as follows:
-- [*] Notice:    Subject to any disclaimer, the term of this
                  patent is extended or adjusted under 35
                  U.S.C. 154(b) by 276 days. --.

Signed and Sealed this

Seventeenth Day of February, 2004

JON W. DUDAS
*Acting Director of the United States Patent and Trademark Office*